(12) United States Patent
Andreux et al.

(10) Patent No.: US 8,361,202 B2
(45) Date of Patent: Jan. 29, 2013

(54) GAS/SOLID SEPARATION SYSTEM FOR THE REGENERATORS OF FLUID CATALYTIC CRACKING UNITS

(75) Inventors: Regis Andreux, Toulouse (FR); Thierry Gauthier, Brignais (FR); Jean-Francois Le Coz, Saint Germain en Laye (FR); Patrick Leroy, Saint Vigor d'Ymonville (FR); Olivier Delsart, Le Havre (FR)

(73) Assignees: IFP Energies Nouvelles, Rueil Malmaison Cedex (FR); Total France, Paris la Defense Cedex (FR)

( * ) Notice: Subject to any disclaimer, the term of this patent is extended or adjusted under 35 U.S.C. 154(b) by 607 days.

(21) Appl. No.: 12/519,096

(22) PCT Filed: Dec. 7, 2007

(86) PCT No.: PCT/FR2007/002021
§ 371 (c)(1),
(2), (4) Date: Apr. 2, 2010

(87) PCT Pub. No.: WO2008/087272
PCT Pub. Date: Jul. 24, 2008

(65) Prior Publication Data
US 2010/0175553 A1    Jul. 15, 2010

(30) Foreign Application Priority Data
Dec. 13, 2006   (FR) ..................................... 06 10982

(51) Int. Cl.
*B01D 45/12* (2006.01)
(52) U.S. Cl. ................ 95/271; 55/474; 55/434; 55/343; 55/345; 55/349; 55/459.1; 55/459.3; 55/459.4; 55/315; 210/513; 210/788; 210/512.2
(58) Field of Classification Search .................... 55/474, 55/434, 343, 345, 349, 459.1, 459.3, 459.4, 55/315; 95/271; 422/139, 168, 144, 147; 208/126, 113, 74; 210/513, 788, 512.2
See application file for complete search history.

(56) References Cited

U.S. PATENT DOCUMENTS 2,461,958 A * 2/1949 Bonnell ......................... 208/74
3,188,185 A * 6/1965 Slyngstad et al. ............ 422/144
(Continued)

FOREIGN PATENT DOCUMENTS
EP   0532071 A1   3/1993
EP   1800742 A1   6/2007
(Continued)

OTHER PUBLICATIONS

Sadeghbeigi, Reza. "Schematic Representation of Exxon's Flexicracker Figs. 1-1; 1-2; and 1-3," (Fluid Catalytic Cracking Handbook) 2000, 2-3.

*Primary Examiner* — Jason M Greene
*Assistant Examiner* — Dung H Bui
(74) *Attorney, Agent, or Firm* — Millen, White, Zelano & Branigan, P.C.

(57) ABSTRACT

A gas/solid separation system that can be applied to any type of FCC unit regenerators, consists of a device for separating solid particles contained in a gas stream coming from the regeneration zone of a fluid catalytic cracking (FCC) unit bounded by an inner envelope (3) of cylindrical shape centered about the vertical axis of the regeneration zone, and an outer envelope (1) that has one approximately horizontal wall (15), followed by one curvilinear wall (16), and one approximately vertical wall (17), the set of said walls (15, 16, 17) covering the inner envelope (3) and forming a set of separation chambers (2) radially distributed around the inner envelope (3) in which the gas/solid suspension to be separated circulates. This system makes it possible to obtain, at the same time, very good separation efficiency while minimizing the pressure drop and only requiring a single downstream cyclone stage.

15 Claims, 2 Drawing Sheets

U.S. PATENT DOCUMENTS

| | | | |
|---|---|---|---|
| 4,664,888 A | 5/1987 | Castagnos, Jr. | |
| 5,259,855 A * | 11/1993 | Ross et al. | 55/349 |
| 5,837,129 A * | 11/1998 | Ross et al. | 208/161 |
| 6,113,777 A * | 9/2000 | Gauthier et al. | 208/161 |
| 6,166,282 A | 12/2000 | Miller | 585/638 |
| 6,296,812 B1 * | 10/2001 | Gauthier et al. | 422/144 |
| 6,641,715 B1 * | 11/2003 | Gauthier | 208/78 |
| 7,220,351 B1 * | 5/2007 | Pontier et al. | 208/113 |
| 7,429,363 B2 * | 9/2008 | Yuan et al. | 422/147 |
| 7,655,822 B2 * | 2/2010 | Ross et al. | 585/240 |
| 2005/0029163 A1 | 2/2005 | Letzsch | |
| 2007/0213573 A1 | 9/2007 | Ross et al. | |

FOREIGN PATENT DOCUMENTS

| | | |
|---|---|---|
| WO | 9911739 A1 | 3/1999 |
| WO | PCTFR2007002021 R | 6/2008 |

* cited by examiner

GAS/SOLID SEPARATION SYSTEM FOR THE REGENERATORS OF FLUID CATALYTIC CRACKING UNITS

FIELD OF THE INVENTION

The invention relates to a separation device that can be applied at the head of the regenerators of fluid catalytic cracking (abbreviation FCC) units. The regeneration zone of the catalytic cracking units may be achieved in a single stage or be divided into two stages. By way of example, mention may be made, as single-stage technology, of Exxon's "flexi-cracker" which functions as a dense fluidized bed, or the FCC technology from UOP which functions as an entrained bed. As an example of a two-stage regeneration zone, mention may be made of the R2R technology from AXENS/SWEC. A schematic representation of these various technologies can be found in the work "Fluid Catalytic Handbook" by Reza Sadeghbeigi published by "Gulf Professional Publishing" on pages 2 and 3 (FIGS. 1-1; 1-2; 1-3).

In the remainder of the text, the separation device, which is the subject of the present invention, will refer to the device enabling the primary separation of the catalyst from the combustion gases, located in the stage or stages of the regeneration zone upstream of one or more secondary separation stages, generally carried out by means of cyclone stages.

Whether the regeneration zone is realized in one stage or in two stages, it must have at least one separation device between the combustion gases and the catalyst regenerated per stage. It should be recalled that the regeneration zone of FCC units is a zone in the fluidized state, carried out in which is the controlled combustion of the coke deposited at the surface of the catalyst originating from the reaction zone, so as to find, at the outlet of said regeneration zone, a very low level of coke before returning the regenerated catalyst to the reaction zone. Typically, the level of coke at the inlet of the regeneration zone is between 0.3 wt % and 2.0 wt %, usually between 0.5 wt % and 1.5 wt %, and is found at the outlet of said zone to be less than 0.05 wt %.

The object of the device for separating the catalyst and the combustion gases is to reduce the concentration of solid particles in the gaseous effluents introduced into the cyclone stage located downstream, the particle separation efficiency being, according to the present invention, at least 90% and preferably at least 95%. This value represents a considerable gain with respect to the values obtained with the devices of the prior art, of the disengagement cross type, such as, in particular, that represented in FIG. 1-2 mentioned above, of which the efficiency does not exceed 60 to 70%. The device according to the present invention makes it possible, through its increased efficiency, to remove one of the cyclone stages located downstream. This results in a substantial gain in compactness, especially when the cyclone stages are located inside the regeneration zone.

It should be recalled that the ratio of the solid to gas mass flow rates in the gas/solid flow at the inlet of the separation zone is generally between 2 and 50, and preferably between 3 and 10.

The prior art relating to systems for separation between the regenerated catalyst and the combustion gases is usually represented by simple devices consisting of an abrupt change in direction of the gas/solid suspension, generally with a single outlet for the gas and for the solid. The standard type of these disengagement devices is the disengagement cross which consists of a set of arms located in the extension, and along a direction approximately perpendicular to the riser of the gas/solid suspension, each arm being equipped with an outlet opening pointing downwards. The efficiency of such systems is generally between 60 and 70 wt %, more specifically, that is to say that after the discharge of the gas/solid suspension via the outlet openings, around 60% of the solid rejoins the dense phase of the fluidized bed located below, whereas 40% of said solid in suspension in the gas will feed the cyclone stage located downstream of the device.

BRIEF DESCRIPTION OF THE FIGURES

The set of appended figures apply both to the configuration of a single-stage regeneration zone and to a two-stage regeneration zone.

BRIEF DESCRIPTION OF THE INVENTION

Figure 2:
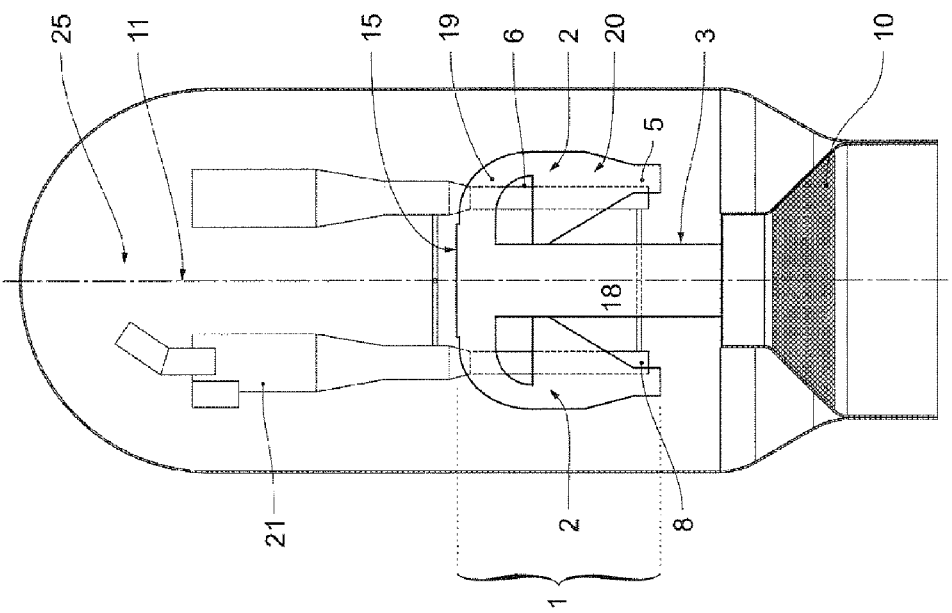
FIG. 2 represents a profile view of the device according to the invention. It makes it possible to visualize the configuration of a separation chamber.

The present invention consists of a device for separating solid particles contained in a gas stream coming from the regeneration zone of a fluid catalytic cracking (FCC) unit bounded by an inner envelope (3) of cylindrical shape centred about the vertical axis of the regeneration zone, and an outer envelope (1) that has one approximately horizontal wall (15), followed by one curvilinear wall (16), and one approximately vertical wall (17), the set of said walls (15, 16, 17) covering the inner envelope (3) and forming a set of separation chambers (2) radially distributed around the inner envelope (3) in which the gas/solid suspension to be separated circulates.

A separation chamber (2) therefore has a first vertical wall common with the vertical wall of the inner envelope (3), a second curvilinear wall formed by the combination of the walls (15), (16) and (17) and two side walls (22), (22') approximately perpendicular to the cylindrical envelope (3).

Each separation chamber (2) communicates, on the one hand, via the inlet sections (4) with the inner cylindrical envelope (3) and, on the other hand, via the outlet sections (5) with the regeneration zone (25) and has at least one side outlet (6) located in the upper part of the side wall (22) and/or (23) of said separation chamber. The side outlet (6) is defined by the space between the portion of the vertical wall of the inner envelope (3) located immediately below the inlet section (4) and the intrados (26) corresponding to the curvilinear wall (16) of the outer envelope (1).

The shape of the side outlet (6) will be approximately that of a quarter of a circle or an ellipse. The term "approximately" is understood to mean the fact that any shape allowing the gas/solid suspension to roll around the curvilinear wall (16) and the corresponding intrados (26) is suitable for the present invention. The exact shape of the side outlet (6) results from the shape of the intrados (26) corresponding to said curvilinear wall (16).

The device according to the invention may comprise baffles (7) located between two successive separation chambers (2), each baffle being fixed to the wall of the inner cylindrical envelope (3) and preferably having an upwardly pointing wing shape, the upper end of the wing being located at a level below the upper level of the side outlets (6). These baffles (7) are provided, in their lower part, with at least one orifice (not shown in the figures) that makes it possible to discharge the catalyst which could accumulate in the angle formed between the lower part of said baffle (7) and the inner cylindrical wall (3).

Giving the baffles (7) any shape that makes it possible to channel the rise of the gas from the side outlets (6) remains within the scope of the present invention. The upwardly pointing wing shape is the preferred shape, but conical or more generally tubular (that is to say a set of suitably inclined tubes) shapes remain entirely within the scope of the present invention. Additional information on the baffles (7) is given in the detailed description.

The device according to the invention has a cylindrical symmetry about the vertical axis of the regeneration zone (25). In particular, the return legs (8) of the cyclones (21) forming the secondary separation stage are inserted between the separation chambers (2) and descend to a level which may be located either above the level of the dense fluidized bed, or be located inside the dense fluidized bed itself. In the latter case it is called a dip leg. Preferably, the return legs (8) will open into the dilute phase surmounting the dense bed.

The return legs (8) could form a certain angle with respect to the vertical. A maximum angle of 20°, and preferably a maximum angle of 15°, with respect to the vertical will be acceptable for proper functioning of the return legs (8). Particularly preferably, the return legs (8) will be approximately vertical, that is to say could depart from the vertical by an angle of at most 5°.

Finally, the return legs could be provided at their lower end with mechanical systems that make it possible to prevent the rise of bubbles inside said legs, and to distribute the gas/solid suspension well towards the outside of the leg. These systems will be of any type known to a person skilled in the art, in particular caps of various shapes, conical caps in particular, or even a simple horizontal plate separated from the lower end of the leg (8) by a distance that is between 0.5 times and 1.5 times the diameter of said return leg.

The device according to the invention allows an efficient separation of the regenerated catalyst particles, before their reintroduction into the reaction zone of the catalytic cracking unit. The efficiency of the gas/solid separation is at least 90%, and usually 95%, which has, in addition, the advantage of enabling the cyclones that constitute the secondary separation stage to operate at lower particle concentration levels, therefore under optimal conditions.

The pressure drop of the device according to the invention is generally slightly higher than that of a device according to the prior art, which is not detrimental in so far as this item is not very important in the pressure balance of the unit.

DETAILED DESCRIPTION OF THE INVENTION

The numbers between brackets in the text correspond to the numbers in FIGS. 1 to 4. The separation device according to the present invention can be applied to fluid catalytic cracking units having a single- or two-stage regeneration zone. In the case of a two-stage regeneration zone, the two stages are connected by a tubular zone having an approximately vertical and elongated shape called a "lift" and denoted by (18) in FIG. 2.

In the case where the regeneration zone only comprises one stage, the device according to the invention is placed in the upper part of the fluidized bed forming said stage in continuity with the walls of the fluidized bed reactor. This continuity is generally provided by a conical transition zone (10) which makes it possible to gradually switch from the diameter of the reactor to the diameter of the cylindrical vertical pipe (18).

As there is no difference in the operation of the device according to the invention whether it is implanted in a single-stage or two-stage regeneration zone, in the remainder of the text the vertical cylindrical pipe (18) which corresponds, depending on the case, either to the lift (in the case of a two-stage regeneration zone), or to the upper part of the fluidized bed (in the case of a single-stage regeneration zone), will not be differentiated.

Generally, the regeneration zone refers to the chamber comprising the fluidized bed within which the coke combustion reaction is carried out, the primary separation device according to the present invention, and the secondary separation device generally composed of one or more cyclone stages.

The description which follows relates both to the case of a 2-stage regeneration zone and to a single-stage regeneration zone, the conical transition zone (10) possibly, in certain cases, being removed.

The device according to the present invention comprises a first inner cylindrical envelope (3) of cylindrical shape in continuity with the walls of the regeneration zone when this is composed of a single stage or in continuity with the walls of the lift when the regeneration zone comprises two stages. In both cases, the continuity is provided via a transition zone (10) of cylindrical-conical shape that makes it possible to switch from the diameter of the reactor or of the lift to that of the inner cylindrical envelope (3).

The envelope of the regeneration zone (25) contains, at the same time, the device according to the present invention, the secondary separation system generally composed of at least one cyclone stage (21) and the dense fluidized bed inside which the controlled combustion of the coke deposited on the catalyst is carried out.

The inner cylindrical envelope (3) is centred about the vertical axis of symmetry of the regeneration zone (25). The inner cylindrical envelope (3) is covered by an outer envelope (1) comprising a first approximately horizontal wall (15) and side walls having a shape that is first curved (16), then approximately parallel (17) to the vertical walls of the inner envelope (3).

Figure 1:
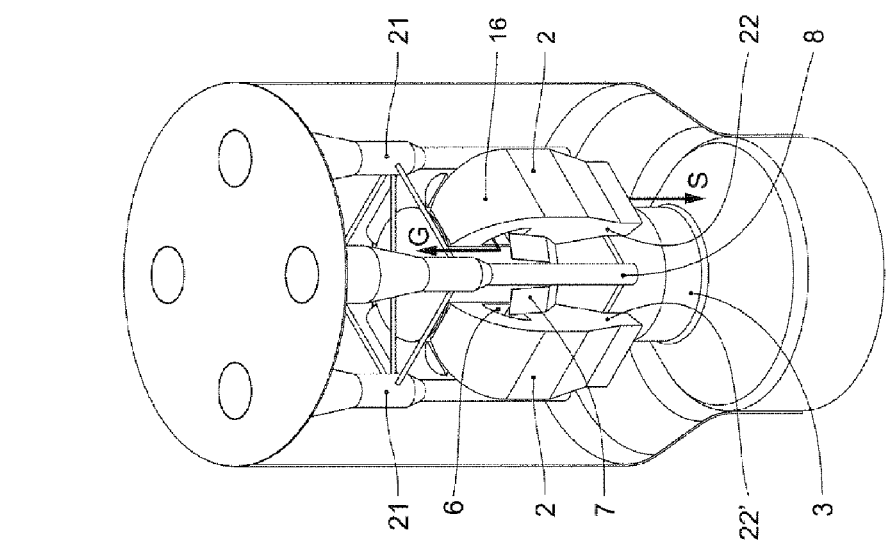
FIG. 1 represents a perspective view of the device according to the invention which makes it possible to visualize the relative position of said device and of the secondary separation system composed of a cyclone stage located downstream.
Figure 4:
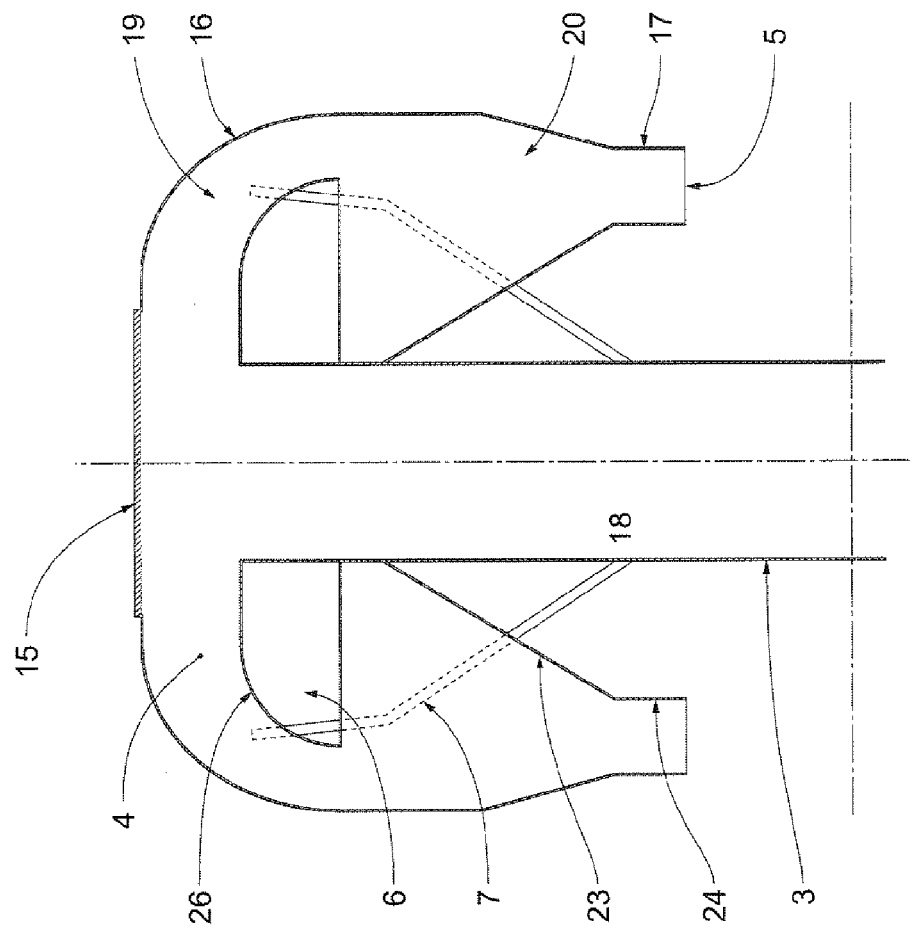
FIG. 4 represents a more particular view of the baffles and of their position relative to the separation chambers and to the return legs of the cyclones. So as not to overcomplicate the figure, the orifice which equips the lower part of the baffles is not represented.
Figure 3:
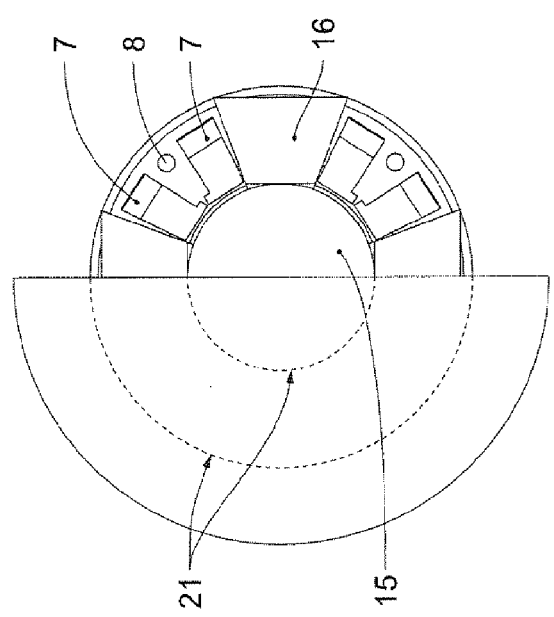
FIG. 3 represents a top view of the device according to the invention comprising a secondary separation system composed of a cyclone stage. It makes it possible to visualize the position of the return legs of the cyclones relative to the separation chambers.

The outer envelope (1) does not form a single surface covering the whole of the inner envelope (3) but, as is shown in FIG. 1, it is divided into a certain number of equal sections of which the outer wall (15; 16; 17) combined with the portion corresponding to the vertical wall of the inner envelope (3) determines a separation chamber (2).

A separation chamber (2) is therefore bounded by two side walls (22), (22') that define one section. The number of separation chambers is between 2 and 6, and is preferably 4.

A separation chamber (2) comprises three zones that can be described in the following manner in the flow direction of the gas/solid suspension:

a first zone (18) in which the flow is approximately vertical and ascending;

a second zone called a centrifuging zone (19) in which the gas/solid suspension undergoes a turnaround of around 180°; and a third vertical descending zone (20) which enables the solid to be discharged out of the separation device via the outlet sections (5) to rejoin the lower part of the regeneration zone (25). This lower part is mainly occupied by the dense fluidized bed within which the controlled combustion reaction of the coke deposited on the catalyst is carried out. The level of this dense fluidized bed is at least one metre below the level of the outlet sections (5).

A separation chamber (2) communicates in its upper part with the cylindrical zone (18) via the flow area (4) delimited, on the one hand, by the upper end of the inner cylindrical envelope (3) and, on the other hand, by the upper wall (15) and (16) of the outer envelope. A separation chamber (2) communicates in its lower part with the regeneration zone (25) via the outlet section (5) delimited, on the one hand, by the vertical wall of the inner cylindrical envelope (3) or by a wall neighbouring the latter but separated from it (23), (24), and, on the other hand, by the vertical wall (17) of the outer envelope (1).

The expressions "inlet section (4)" and "outlet section (5)" should be understood in terms of the flow direction of the gas/solid suspension which enters into the centrifuging zone via the inlet section (4), and exits the separation device via the outlet section (5).

The separation chambers (2) are radially distributed around the vertical cylindrical zone (18) defined by the inner cylindrical envelope (3).

Each separation chamber (2) comprises in its upper part an opening (6) that connects the upper part of the regeneration zone (25) with the centrifuging zone (19) and allows the gas to be disengaged whilst the solid particles of the gas/solid suspension remain inside said separation chamber while being directed towards the descending vertical zone (20).

The centrifuging zone (19) is defined so as to enable the gas/solid suspension to be rotated in an approximately vertical plane about an angle of around 180° with respect to the vertical.

The solid particles which have an approximately vertical and ascending movement at the inlet of the centrifuging zone (19) originating from the inlet section (4) are found at the outlet of said centrifuging zone (19) with an approximately vertical and descending movement which continues inside the descending vertical zone (20) to the particle outlet section (5).

The disengagement of the gas through the opening (6) may be promoted by baffles (7) fixed to the vertical wall of the inner envelope (3) and provided with at least one orifice in their lower part in the vicinity of the angle formed by said lower part and the cylindrical vertical wall (3). More specifically, these baffles (7) are located between the separation chambers (2) while allowing the passage of the return legs (8) of the cyclones (21). Each baffle (7) preferably has an upwardly pointing wing shape, the upper end of the wing being located at a level below the upper level of the side opening (16).

Each baffle (7) has a lower inclined part fixed to the wall of the inner cylindrical envelope (3), the angle of inclination being between 15 and 30 degrees relative to the vertical. This lower part is pierced by at least one orifice to allow the discharge of the catalyst which could possibly accumulate in the angle formed by said lower part and the cylindrical vertical wall (3).

Each baffle (7) has an upper, approximately vertical part located at at least 150 mm with respect to the vertical wall of the inner cylindrical envelope (3).

There are 2, 4 or 6 separation chambers (2), baffles (7) and return legs (8) of the cyclones and they form an assembly that respects the symmetry about the vertical axis (11) of the regeneration zone (25).

Preferably, the number of separation chambers will be 2 or 4.

The circulation rate of the gas/solid suspension in the vertical pipe (18) is generally between 5 and 30 m/s, and preferably between 12 and 25 m/s. The inlet sections (4) are calculated so as to approximately respect the circulation rate such as exists in the vertical pipe (18). For example, in the hypothesis of a device having 4 separation chambers (2) the inlet sections (4) will have a value approximately equal to a quarter of the cross section of the vertical pipe (18).

The mass flow rate ratio of the solid to the gas is generally between 2 and 40, and preferably between 4 and 25.

The gas outlet rate at the side outlets (6) is between 5 and 20 m/s, and preferably between 5 and 12 m/s.

A certain amount of gas is also discharged via the outlet sections (5). This gas fraction may represent between 20% and 70% of the total gas, and its value mainly depends on the surface area ratio between the sections (5) and (6).

The flow rate of solid particles discharged by the outlet sections (5) is generally between 50 kg/(m$^2$·s) and 1500 kg/(m$^2$·s), and preferably between 100 kg/(m$^2$·s) and 500 kg/(m$^2$·s) for standard FCC catalyst particles, of which the grain density is between 1500 kg/m$^3$ and 2000 kg/m$^3$, and of which the average diameter is between 60 and 80 microns.

The invention claimed is:

1. Device for separating solid particles contained in a gas stream coming from the regeneration zone of a fluid catalytic cracking (FCC) unit bounded by an inner envelope (3) of cylindrical shape centred about the vertical axis (11) of the regeneration zone (25), and an outer envelope (1) that has one approximately horizontal wall (15), one curvilinear wall (16), and one approximately vertical wall (17), the set of said walls (15, 16, 17) covering the inner envelope (3) and forming a set of separation chambers (2) radially distributed around the inner envelope (3) in which the gas/solid suspension to be separated circulates, each separation chamber (2) communicating, via inlet sections (4) with the inner cylindrical envelope (3) and, via outlet sections (5) with the lower part of the regeneration zone (25) and having at least one side outlet (6) located in the upper part of the side wall (22) of the separation chamber (2), said side outlet (6) being defined by the space between the portion of the vertical wall of the inner envelope (3) located immediately below the inlet section (4) and intrados (26) corresponding to the curvilinear wall (16) of the outer envelope (1), said device comprises, in addition, baffles (7) located between two successive separation chambers (2), each baffle (7) being fixed to the wall of the inner cylindrical envelope (3), and return legs (8) of cyclones (21) forming the secondary separation stage, are inserted between the separation chambers (2), and are aligned in a circle having a diameter between the diameter of the inner cylindrical envelope (3) and the larger diameter of the outer envelope (1).

2. Device according to claim 1, in which each baffle (7) has an upwardly pointing wing shape, the upper end of the wing being located at a level below the upper level of a side opening (16).

3. Device according to claim 1, in which each baffle (7) has a lower inclined part fixed to the wall of the inner cylindrical envelope (3), the angle of inclination being between 15 and 30 degrees relative to the vertical.

4. Device according to claim 1, in which each baffle (7) has an upper, approximately vertical part located at least 150 mm with respect to the vertical wall of the inner cylindrical envelope (3).

5. Device according to claim 1, in which there are 2 or 4 separation chambers (2), baffles (7) and return legs (8) of the cyclones and they form an assembly that respects the symmetry about the vertical axis (11) of the regeneration zone (25).

6. Device according to claim 1, in which the level of a dense fluidized bed located in the lower part of the regeneration zone (25) is at least one meter lower than the level of the outlet sections (5).

7. Process for separating solid particles contained in a gas/solid suspension using the device according to claim 1, in which the circulation rate of the gas/solid suspension in the inlet sections (4) is between 5 m/s and 30 m/s.

8. Process for separating solid particles contained in a gas/solid suspension using the device according to claim 1, in which the mass flow rate ratio of the solid to the gas at the inlet sections (4) is between 2 and 40.

9. Process for separating solid particles contained in a gas/solid suspension using the device according to claim 1, in which the gas outlet rate at the side openings (6) is between 5 and 30 m/s.

10. Process for separating solid particles contained in a gas/solid suspension using the device according to claim 1, in which the gas/solid suspension is introduced into a vertical pipe (18) where it flows with vertical ascending flow, then enters into a centrifuging zone (19) via a flow area (4) where it rotates around 180° so as to enable the disengagement of the gas, which is mainly discharged via an opening (6), the solid particles moving vertical downwards through a vertical descending zone (20) and being discharged towards the lower part of the regeneration chamber (25) via the outlet section (5).

11. Process for separating solid catalyst particles contained in a gas/solid suspension comprising separating said suspension in the device according to claim 1, in which the catalyst flow rate through the outlet section (5) is between 50 and 1500 kg/(m$^2$·s).

12. A process according to claim 11, wherein the catalyst flow rate is between 100 kg/(m$^2$·s) and 500 kg/(m$^2$·s).

13. A process according to claim 7, wherein circulation rate is between 8 m/s and 20 m/s.

14. A process according to claim 8, wherein said mass flow rate ratio is between 4 and 25.

15. A process according to claim 9, wherein the gas outlet rate is between 5 m/s and 12 m/s.

\* \* \* \* \*

UNITED STATES PATENT AND TRADEMARK OFFICE
CERTIFICATE OF CORRECTION

PATENT NO. : 8,361,202 B2  Page 1 of 1
APPLICATION NO. : 12/519096
DATED : January 29, 2013
INVENTOR(S) : Andreux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this
First Day of September, 2015

Michelle K. Lee
*Director of the United States Patent and Trademark Office*